(12) United States Patent
Weaver et al.

(10) Patent No.: US 7,213,490 B2
(45) Date of Patent: *May 8, 2007

(54) WILDLIFE GUARD PLACEMENT TOOL

(75) Inventors: Steven G. Weaver, Tyler, TX (US); Ronald B. Stidham, Tyler, TX (US)

(73) Assignee: Basic Resources, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/099,405

(22) Filed: Apr. 5, 2005

(65) Prior Publication Data

US 2005/0199100 A1    Sep. 15, 2005

Related U.S. Application Data

(63) Continuation of application No. 10/059,816, filed on Jan. 28, 2002, now Pat. No. 6,877,400.

(51) Int. Cl.
*B25B 23/16* (2006.01)
(52) U.S. Cl. .................. 81/53.1; 269/254 CS
(58) Field of Classification Search ............. 81/53.1; 269/45, 64, 238, 254 CS
See application file for complete search history.

(56) References Cited

U.S. PATENT DOCUMENTS

| | | | | |
|---|---|---|---|---|
| 1,244,339 | A | * 10/1917 | Johnson, Jr. ................ | 439/477 |
| 1,704,491 | A | 3/1929 | Thompson | |
| 2,352,686 | A | * 7/1944 | Broadbooks ............... | 81/53.1 |
| 3,473,837 | A | 10/1969 | Goodman | |
| 4,110,943 | A | 9/1978 | Carlson | |
| 4,906,801 | A | 3/1990 | Beasley | |
| 5,564,852 | A | 10/1996 | Maxwell et al. | |
| 5,593,196 | A | 1/1997 | Baum et al. | |
| 5,648,641 | A | 7/1997 | Guthrie | |
| 5,650,594 | A | 7/1997 | Urnovitz | |
| 5,794,495 | A | 8/1998 | Anderson | |
| 6,382,611 | B1 | * 5/2002 | Ramer ....................... | 269/238 |
| 6,453,775 | B1 | 9/2002 | Dietrich et al. | |
| 6,473,953 | B1 | * 11/2002 | Portnoff ...................... | 29/241 |

(Continued)

OTHER PUBLICATIONS

3M Electrostatic Animal Guard (formerly the Guthrie Guard), Instruction Sheet, 1998, pp. 1-4, 78-8121-101-7(c), 3M Elect. Prod. Div., Austin, TX.

(Continued)

*Primary Examiner*—Lee D. Wilson
(74) *Attorney, Agent, or Firm*—Hunton & Williams LLP

(57) ABSTRACT

A tool for placement of a wildlife protection guard on an insulated bushing on a transformer is provided. The tool includes a body, a hook, a connector, a first and second tension member and a tensioning mechanism. The body has a first end, a second end operable to receive the wildlife protection guard, an upper side and lower side. The hook is adjacent the first end of the body. The connector extends from the lower side of the body and is pivotably attachable to an end of an extendable pole. The first and second tension members define a portion of the second end of the body and further define a slot for receiving a portion of the wildlife protection guard. The tensioning mechanism communicates with the first and second tension members and is operable to adjust the tension on the wildlife protection guard receivable in the slot.

13 Claims, 10 Drawing Sheets

U.S. PATENT DOCUMENTS

| | | |
|---|---|---|
| 6,474,197 B1 | 11/2002 | Browen et al. |
| 6,483,060 B1 | 11/2002 | Taylor |
| 6,642,464 B1 | 11/2003 | Taylor |
| 6,823,631 B2 | 11/2004 | Homer et al. |
| 6,877,400 B2 | 4/2005 | Weaver et al. |
| 2005/0034884 A1 | 2/2005 | Lee |

OTHER PUBLICATIONS

Telescopic Hot Sticks, Hastings Tel-O-Pole Hot Sticks . . . ; internet website; Jan. 10, 2002, 4 pgs, Hastings Fiber Glass, Products, Inc., Hastings, MI.

Critter Guard, Pole Guard, internet website, 2 pgs, Critter Guard, Inc., Columbia, MO, May 13, 2003.

Critter Guard, Line Guard, internet website, 2 pgs, Critter Guard, Inc., Columbia, MO, May 13, 2003.

\* cited by examiner

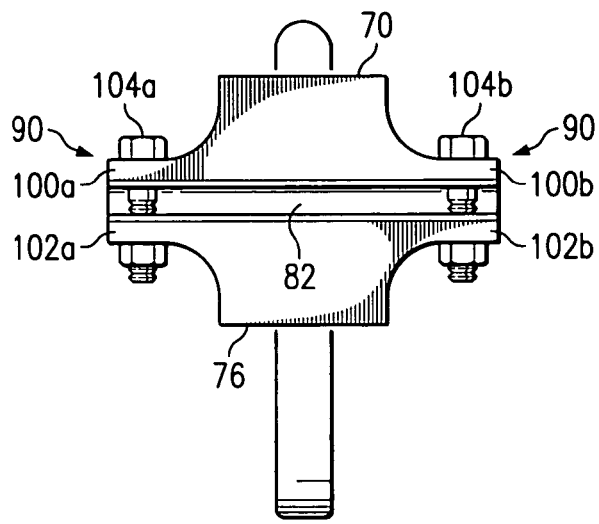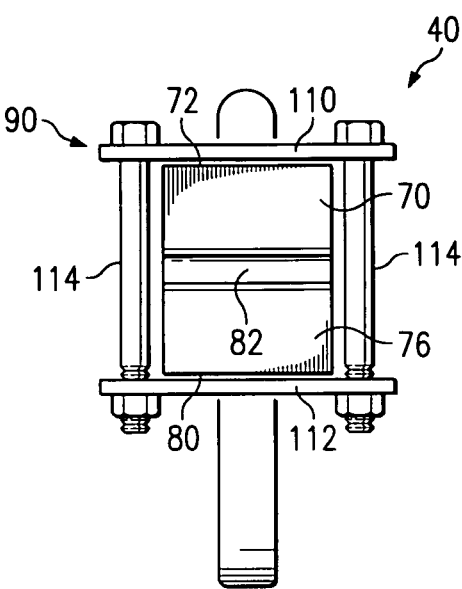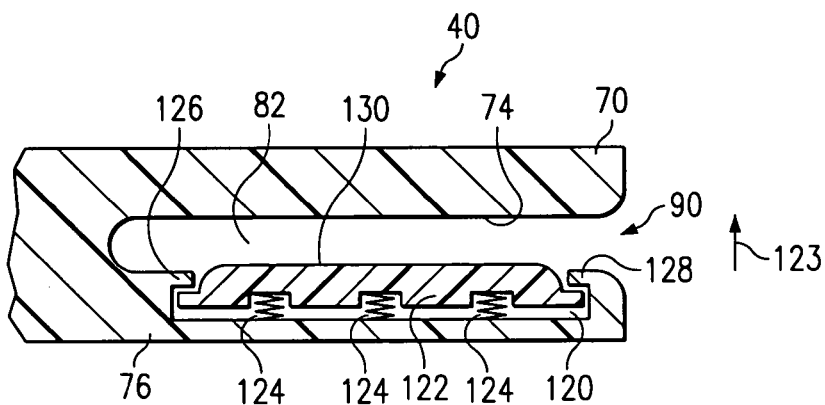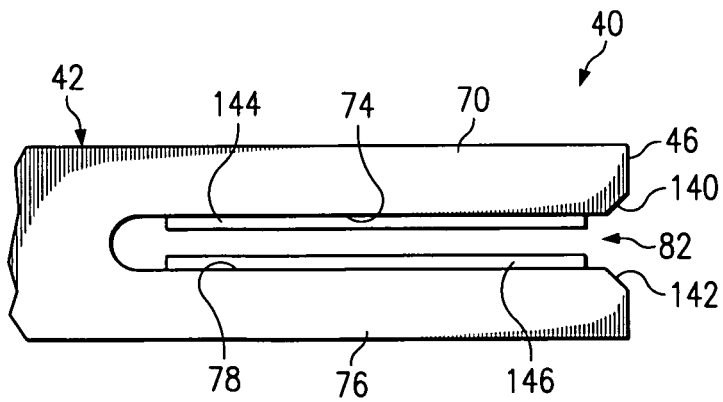

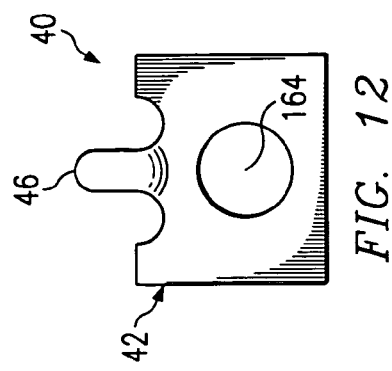
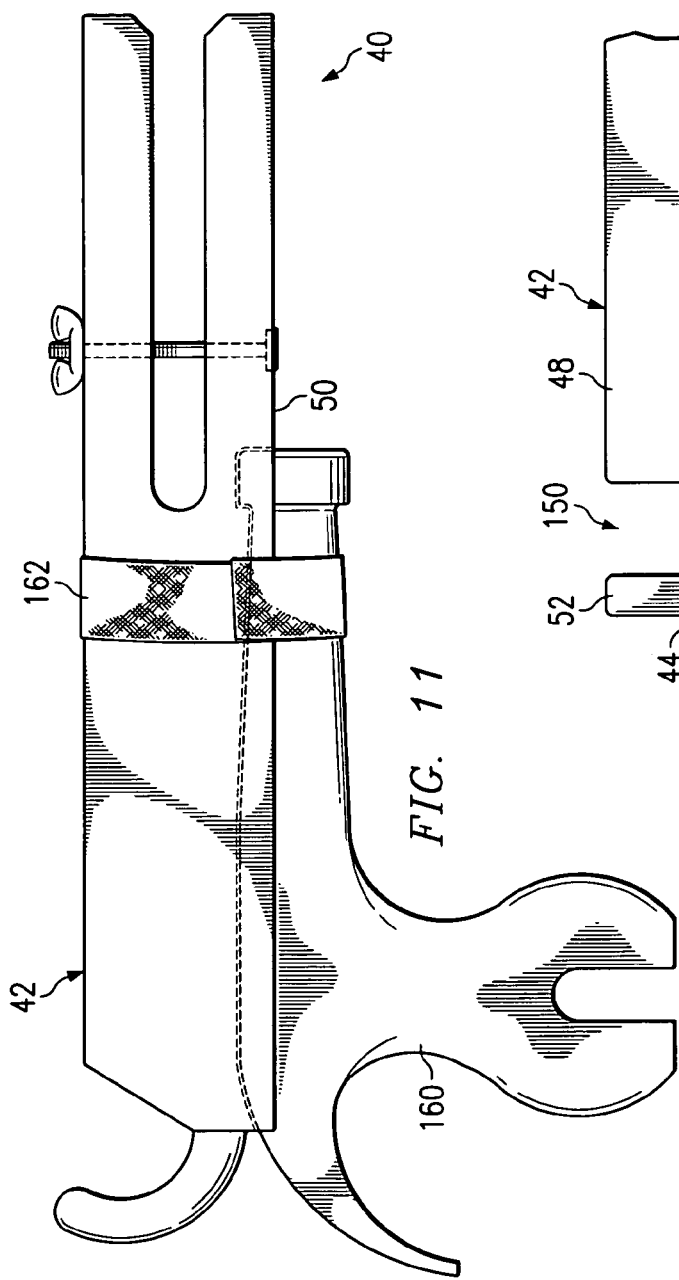
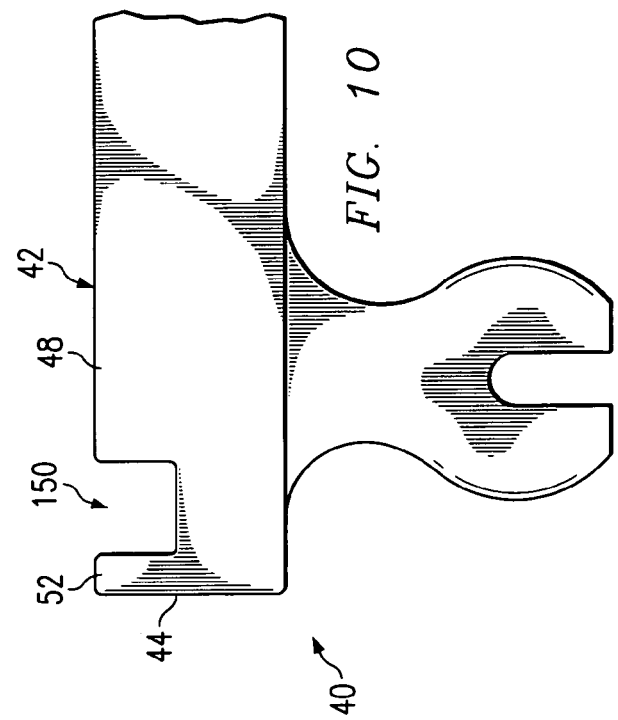

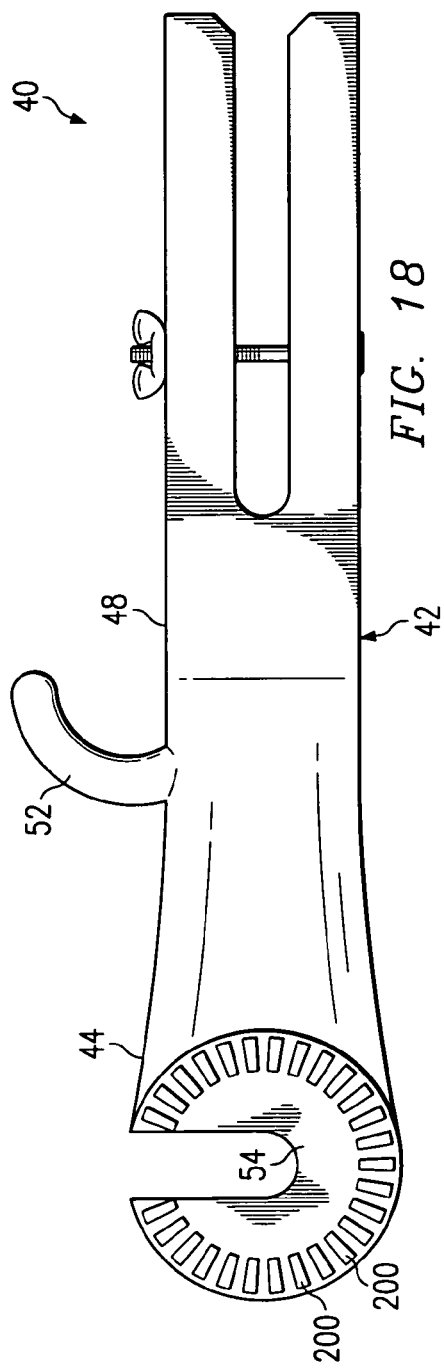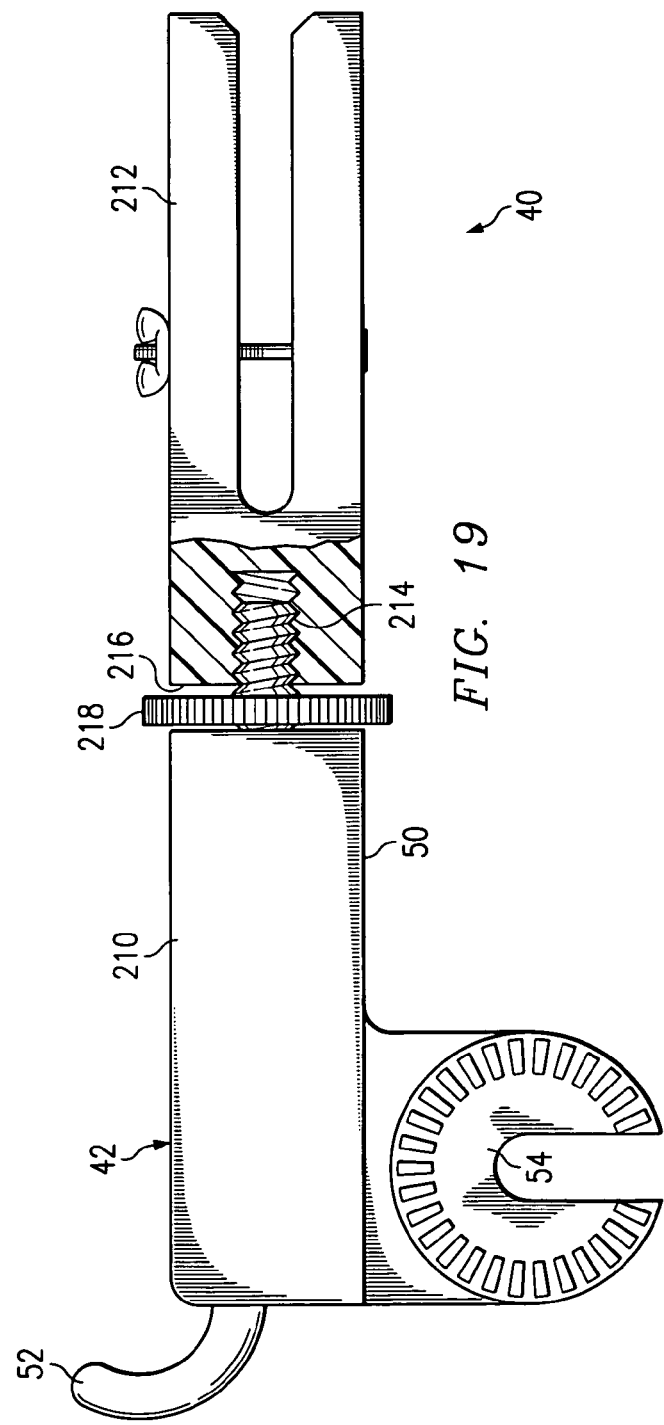

WILDLIFE GUARD PLACEMENT TOOL

CROSS-REFERENCE TO RELATED APPLICATIONS

This application is a continuation of U.S. patent application Ser. No. 10/059,816, entitled Wildlife Guard Placement Tool, filed Jan. 28, 2002, now U.S. Pat. No. 6,877,400 naming Steven G. Weaver and Ronald B. Stidham as inventors, the entire contents of the above-referenced application is hereby incorporated by reference for all purposes.

TECHNICAL FIELD OF THE INVENTION

This invention relates generally to the field of tools utilized for maintenance of electrical distribution systems and more particularly, but not by way of limitation, to a wildlife guard placement tool for positioning wildlife guards on insulator bushings on electrical transformers.

BACKGROUND OF THE INVENTION

Electrical power outages occur for a number of reasons including severe weather causing damage to the electrical distribution system, mechanical failures or wildlife interfering with system components. Most of these causes cannot be prevented and may only be repaired after the outage occurs. Some wildlife associated problems, however, may be prevented.

Squirrels, for example, frequently traverse the elevated electrical lines and utility poles and may climb onto the transformers elevated on the utility poles. An insulated bushing sits atop the transformer where the electrical line connects to the transformer. Unfortunately, a potential electrical difference exits between the electrical line and the transformer that may electrocute the squirrel if the squirrel simultaneously contacts the transformer and the electrical line.

Several devices have been utilized to eliminate this problem. A wildlife protection guard, known as the Electrostatic Animal Guard manufactured by 3M, is an example of a device that has been successfully employed for this purpose. The wildlife protection guard is not widely used because installation on the insulated bushing atop an elevated transformer requires that the worker be positioned at a height level with the transformer. A worker is forced to climb the utility pole or be raised by an aerial lift to install each wildlife protection guard.

Once at the proper elevation, the worker loads the wildlife protection guard into a straight tool known as a "shotgun-stick." Using the shotgun-stick, the worker stabs the wildlife protection guard onto the insulated bushing and activates a triggering mechanism on the shotgun-stick to release wildlife protection guard.

The shotgun-stick is, by design, incapable of being used with extendable poles, or "extendo-sticks," that extend up to 30 feet and are commonly employed by line-workers to reach from the ground up to the transformers and electrical lines overhead. Attempts have been made to fashion tools for attachment to the extendable pole for placing the wildlife protection guard.

One such attempt included cutting a notch into one end of a block of wood. The block was then taped to a hammer head. A hammer head may be connected to extendable poles and is ordinarily used for replacing blown fuses. The notch in the block of wood would pinch a portion of the wildlife protection guard while the wildlife guard was raised and placed on the insulated bushing on the transformer.

Another such device, the Animal Guard Applicator, is shown in U.S. Pat. No. 5,794,495 to Anderson. The device disclosed in the Anderson reference proposes to balance the wildlife protection guard on a rake-like structure stabilized with tines.

To this end, a need exists for a device to more safely and effectively place wildlife protection guards on the insulated bushing on transformers elevated on utility poles.

SUMMARY OF THE INVENTION

The present invention provides a tool for placement of a wildlife protection guard on an insulated bushing portion of a transformer. The tool includes a body, a hook portion, a connector portion and a tensioning mechanism. The body has a first end, a second end operable to receive the wildlife protection guard, an upper side and lower side. The hook portion is adjacent the first end of the body.

The connector portion extends from the lower side of the body, the connector is pivotably attachable to an end of an extendable pole and is operable to position the tool in a first position substantially perpendicular relative to the extendable pole and further operable to position the tool in a second position substantially non-perpendicular relative to the extendable pole. The connector portion is further operable to position the tool in a third position wherein the tool is substantially angularly offset the end of the extendable pole when the tool is in the first and second positions.

A first tension member defines a portion of the second end of the body adjacent the upper side of the body. The first tension member has an upper side and a lower side. A second tension member defines a portion of the second end of the body adjacent the lower side of the body. The second tension member has an upper side and a lower side. A portion of the upper side of the second tension member and a portion of the lower side of the first tension member define a slot operable to receive a portion of the wildlife protection guard.

A tensioning mechanism engages with the first and second tension members, the tensioning mechanism is operable to adjust a distance between the lower side of the first tension member and the upper side of the second tension member to adjust the tension on the wildlife protection guard receivable in the slot.

One advantage provided by the present invention is that the wildlife protection guard is quickly and easily received in the slot and first and second tension members provide significant stability when the wildlife guard is moved into position on the insulated bushing on the transformer. Another advantage of the present invention is that the configuration is robust and will withstand considerable impact and wear and continue to function and operate for the purposes for which it is intended.

Another advantage of the present invention is the wildlife protection guard is simply and easily received into the slot. Also, the slot defined by the first and second tension members provides significant stability for raising and placing the wildlife guard on the insulator bushing on the transformer.

Another advantage of the present invention is that the connector allows the tool to be easily positioned at the correct angle for placement of the wildlife guard when insulator bushing is angularly disposed on the transformer. Positioning the tool, and the wildlife protection guard retained by the tool, at the proper angle ensures correct placement of the wildlife protection guard on the insulator bushing regardless of the orientation of the insulator bushing.

In one aspect, the tensioning mechanism is a connector extending through a portion of the first and second tension members. In another aspect, the tensioning mechanism is defined as at least a first fastener operable to engage using tension the first and second tension members. In yet another aspect, the tensioning mechanism is a tensioning band extending about at least a portion of an outer surface of the first and second tension members.

Another advantage provided by the present invention is that the tensioning mechanism allows for adjustment of the slot for proper tensioning when receiving wildlife protection guards of various sizes. In addition, the tensioning mechanism is advantageous for adapting to wear and tear of the tool causing the slot to be wider than originally designed by providing the capability to adjust to provide sufficient tension for placement of the wildlife protection guard.

In one aspect, the lower side of the first tension member is provided with a frictional surface to frictionally engage the wildlife protection guard. In another aspect, the upper side of the second tension member is provided with a frictional surface to frictionally engage the wildlife protection guard. While in yet another aspect, the lower side of the first tension member and the upper side of the second tension member are provided with a frictional surface to frictionally engage the wildlife protection guard.

One advantage of the present invention is that providing the frictional surface allows for improved tensioning and stability when positioning the wildlife guard and improved overall wear of the tool.

In one aspect, the hook portion arcuately extends upwardly from the first end of the body. In another aspect, the hook portion is defined as a notch in the upper side of the body. In another aspect, the third position of the tool by the connector portion is defined as slanted relative to the extendable pole in a side-to-side manner such that the upper side of the body is angulated in a direction away from the extendable pole.

Another advantage of the present invention is that the upwardly extending hook promotes easy removal of wildlife protection guards that require removal for various reasons such as wildlife protection guards that are improperly installed or is inoperable. The upwardly extending hook retains the wildlife protection guard after removal instead of merely dislodging the wildlife guard and allowing the wildlife protection guard to fall to the ground from the transformer.

In one aspect, the first tension member is further provided with a first end and a beveled portion adjacent the first end of the first tension member. The beveled portion formed adjacent the lower side of the first tension member. The second tension member is further provided with a first end and a beveled portion adjacent the first end of the second tension member, the beveled portion communicating with the uppers side of the second tension member. One advantage to the beveled portions of the first and second tension members is that the portion of the wildlife protection guard is more easily received in the slot.

In one aspect, the body, the hook portion, the first and second tension members and the connector portion are unitarily constructed. While in other aspects, the hook portion, the first and second tension members and the connector are constructed of a substantially rigid polymeric material. One advantage of the configuration of the present invention is that it provides for simple and inexpensive construction in that the body, the hook, the first and second tensioning member and the connector portion may be readily molded unitarily from polymeric material, such as by injection molding.

In one aspect, the connector portion adjacent the lower side of the body is operable to attach the tool to a hammer head connectable to an extendable pole. This provides yet another advantage of the present invention in that the tool may be connectable in one aspect to an end of an extendable pole and in another aspect to a hammer head connectable to an extendable pole.

In yet another aspect, the present invention provides to a tool for placement of a wildlife protection guard on an insulated bushing portion of a transformer. The tool includes a body having a first end, a second end, an upper side and lower side. A portion of the body adjacent the second end defining an opening extending a distance from the second end of the body toward the first end of the body, the opening operable to receive a portion of the wildlife protection guard. In one aspect, the tool further includes an extendable pole, while in other aspects the tool may be connectable to an end of an extendable pole or, in other aspects, to a hammer head connectable to an extendable pole.

In one aspect the tool is further provided with a tensioning mechanism disposed adjacent the opening to facilitate tensioning the portion of the wildlife protection guard disposable in the opening of the body. In other aspects the tool has a hook portion adjacent the first end of the body, the hook extending generally upwardly.

In yet other aspects, the tool also includes a connector portion extending from the lower side of the body. The connector portion pivotably attachable in some aspects to an end of an extendable pole and in other aspects to a hammer head. The connector portion operable to position the tool in a first position substantially perpendicular relative to the extendable pole and further operable to position the tool in a second position substantially non-perpendicular relative to the extendable pole. The connector portion further operable to position the tool in a third position wherein the tool is substantially angularly offset the end of the extendable pole when the tool is in the first and second positions.

In one aspect, the present invention provides a method for placement of a wildlife protection guard on an insulated bushing portion of a transformer, the method includes providing a tool for placement of a wildlife protection guard on the insulated bushing portion of the transformer. The tool includes a body having a first end, a second end, an upper side and lower side. A portion of the body adjacent the second end defining an opening extending a distance from the second end of the body toward the first end of the body. The opening is operable to receive a portion of the wildlife protection guard.

The tool further includes a hook portion and a tensioning mechanism. The hook portion is adjacent the first end of the body and extends generally upwardly. The tensioning mechanism is disposed adjacent the opening to facilitate tensioning the portion of the wildlife protection guard disposable in the opening of the body.

This method includes providing an elongated pole connected to the tool. The tool connected to the elongated pole at one end of the elongated pole. The method further provides for adjusting the tension mechanism of the tool to tensioningly receive the wildlife protection guard in a releasable manner.

The method includes inserting a portion of the wildlife protection guard in the opening in the body of the tool such that the wildlife protection guard is retained by the tool and manipulating the elongated pole such that the wildlife protection guard is substantially adjacent the insulated bushing on the transformer. The method also provides for manipulating the elongated pole to attach the wildlife protection guard on the insulated bushing on the transformer and manipulating the elongated pole such that the tool is extended away from the insulated bushing on the transformer to withdraw the wildlife protection guard from the opening in the body of the tool.

Other objects, features, and advantages of the present invention will be apparent to those skilled in the art from the following detailed description when read in conjunction with the accompanying drawings and appended claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 5 is a partial perspective view of one aspect of the tool according to the present invention having a tensioning mechanism on one end of the tool;

FIG. 6 is a front view of another aspect of the tool according to the present invention shown with another aspect of the tensioning mechanism;

FIG. 7 is a front view of the tool according to the present invention shown with yet another aspect of the tensioning mechanism;

FIG. 8 is a partial cross-sectional view of the tool in FIG. 3 taken along 8—8 thereof illustrating another aspect of the tensioning mechanism constructed in accordance with the present invention;

FIG. 9 is a side view of the tool constructed according to one aspect of the present invention having frictional surfaces for engaging a portion of the wildlife protection guard;

FIG. 10 is a partial side view of the tool of the present invention illustrating yet another aspect of the hook portion;

FIG. 11 is a perspective view of one aspect of the tool constructed in accordance with the present invention shown attached to a hammer head;

FIG. 12 is an end view of the tool according to another aspect for connection to the hammer head;

FIG. 18 is a side view of another aspect of the present invention shown with a geared connector portion;

FIG. 19 illustrates another aspect of the present invention for angularly positioning of a portion of the tool engagable to the wildlife protection guard.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
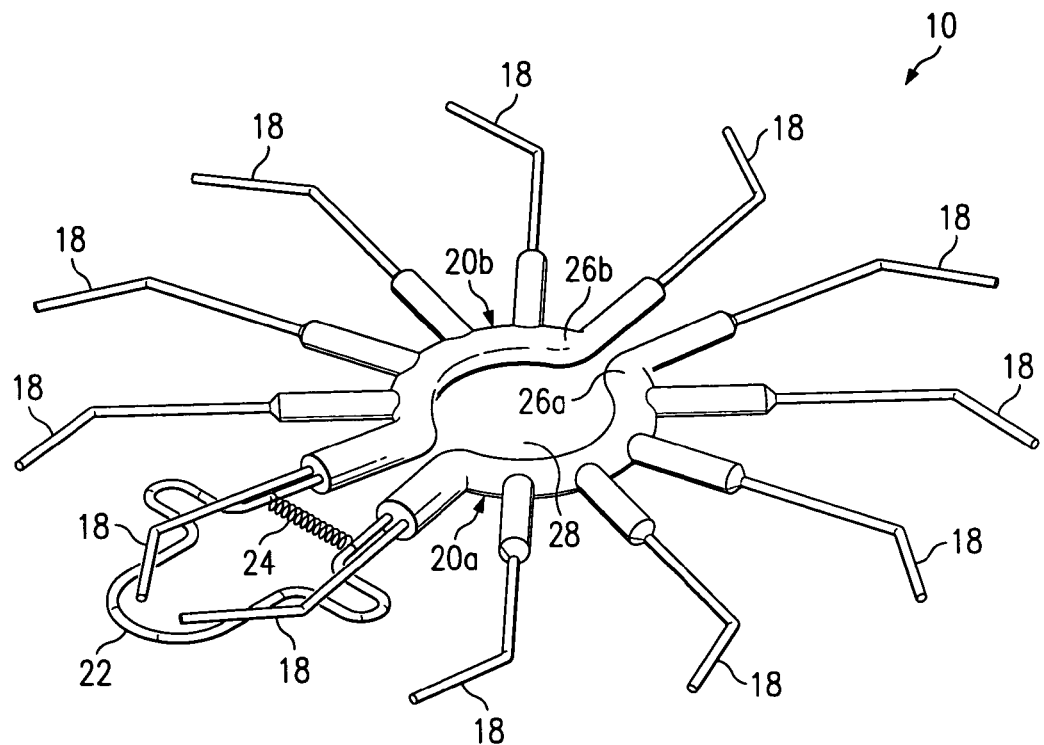
FIG. 1 is a perspective view of a wildlife protection guard.
Figure 2:
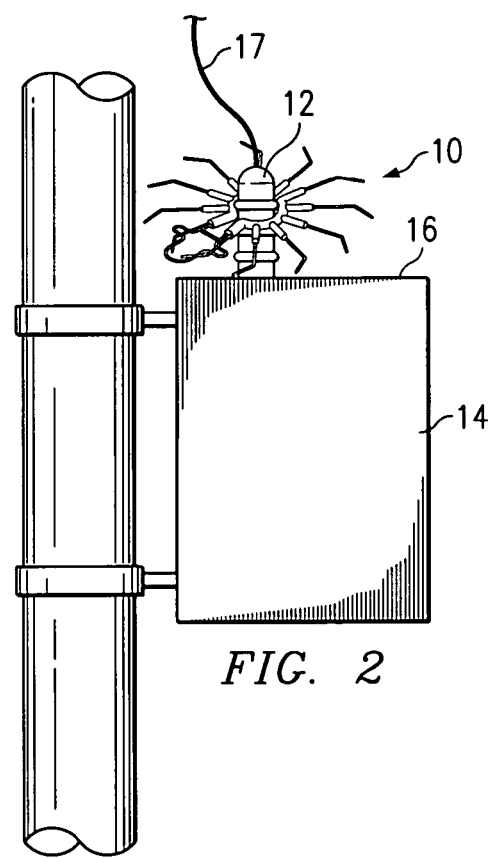
FIG. 2 is a perspective view of the wildlife protection guard shown installed on an insulated bushing on a transformer.

FIG. 1 and FIG. 2 illustrate a wildlife protection guard 10 which, as previously discussed, is manufactured by 3M under the name Electrostatic Animal Guard, and may be installed on an insulated bushing 12 provided on a transformer 14. The wildlife protection guard 10 prevents an animal, such as a squirrel, from simultaneously contacting a top 16 of the transformer 14 and a wire 17 connected to the electrical line (not shown) extending from the insulated bushing 12. The wildlife protection guard 10 is useful in both preventing the animals from being harmed, as well as preventing damage to the electrical distribution system caused by such a short circuit.

The wildlife protection guard 10 is provided with a plurality of wires 18 extending from a pair of semi-circular insulated members 20a and 20b. The insulated members 20a and 20b are connected to one another by a connecting wire 22. A spring 24 is connected near the ends of the connecting wire 22 where the connecting wire 22 is attached to the insulated members 20a and 20b. The spring 24 connected to the connecting wire 22 in this manner causes the insulated members 20a and 20b to be biased toward one another in a clamping manner.

The wildlife protection guard 10 is forced about the insulated bushing 12 near a connection point 26a and 26b of the insulated members 20a and 20b, respectively. The insulated members 20a and 20b expand to receive the insulated bushing 12 within the opening 28 defined by the insulated members 20a and 20b. The insulated bushing 12 is received in the opening 28 of the wildlife protection guard 10 and the overall configuration of the wildlife protection guard 10 promotes a resilient clamping engagement of the insulated members 20a and 20b about the insulated bushing 12.

When the wildlife protection guard 10 is placed about the insulated bushing 12, the plurality of wires 18 of the wildlife protection guard 10 become electrostatically charged. An animal, such as a squirrel, attempting to move from the top 16 of the transformer 14 to the wire 17 connected to the insulated bushing 12 will likely contact the plurality of wires 18 of the wildlife protection guard 10 and receive a mild deterring electrical shock preventing the animal from simultaneously contacting the wire 18 and the top 16 of the transformer 14. It can be seen that this configuration of wildlife protection guard is useful to prevent harm to animals, such as squirrels, and prevent damage to the transformer 14 from such short circuits.

Figure 3:
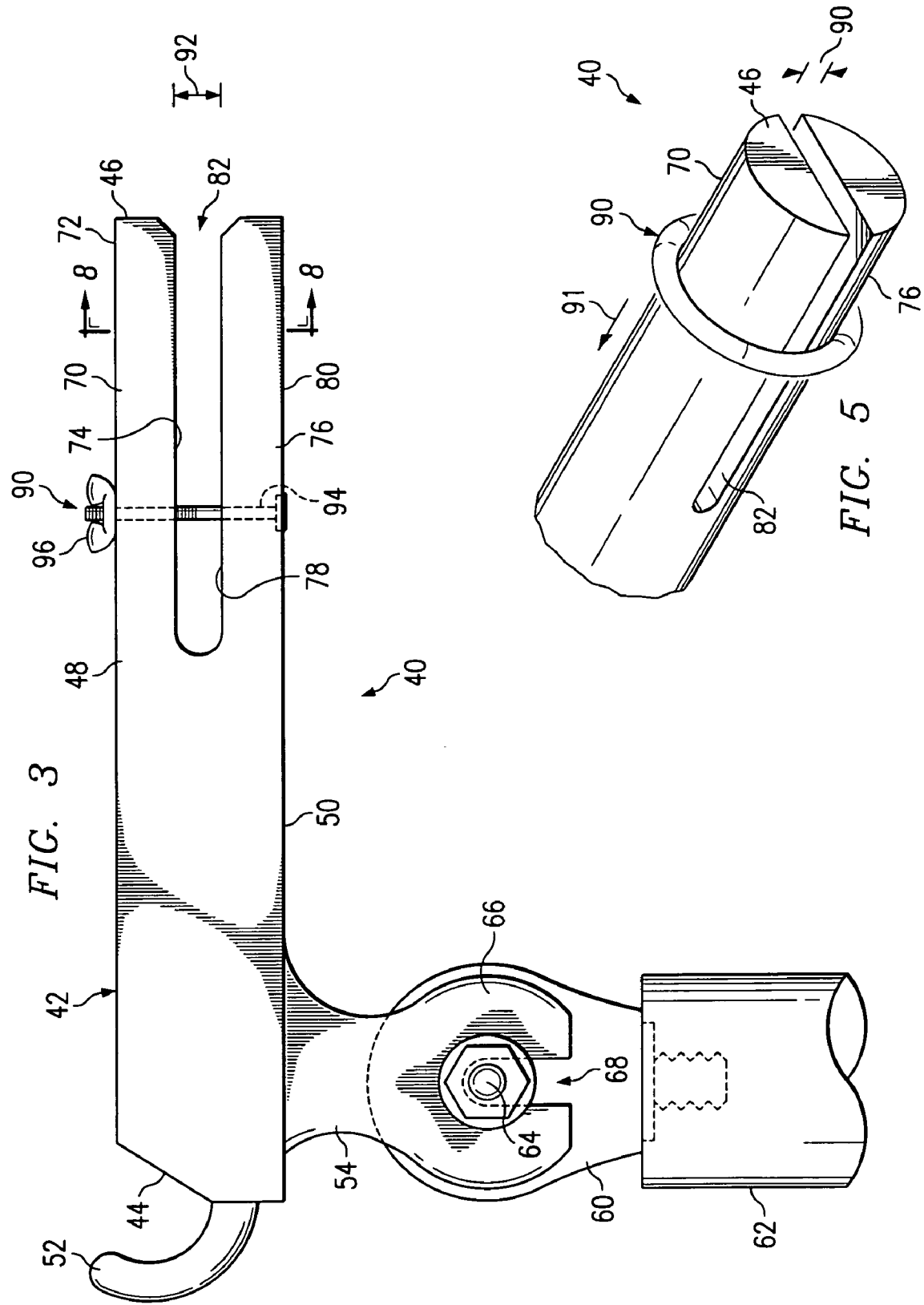
FIG. 3 is a side view of one aspect of a tool constructed in accordance with the present invention for placement of the wildlife protection guard on the insulated bushing of the transformer.

FIG. 3 illustrates a tool 40 constructed in accordance with the present invention for placement of the wildlife protection guard 10. The tool 40 includes a body 42 that has a first end 44 and a second end 46 operable to receive the wildlife protection guard 10. The body 42 further includes an upper side 48 and a lower side 50 and may be constructed from a variety of materials including, but not limited to, metallic and polymeric materials.

The tool includes a hook portion 52 adjacent the first end 44 of the body 42. The hook portion 52, in the present aspect, is a generally upwardly arching member useful for removing the wildlife protection guard 10 from the insulted bushing 12. A connector portion 54 extends from the lower side 50 of the body 42 for pivotal attachment to an end 60 of an extendable pole 62.

The extendable pole 62 is commonly referred to as an extendo-stick or hot-stick and is used by electrical line workers. The extendable pole 62 is a well-known tool capable of extending from 6 to 30 feet to allow the worker to reach from the ground up to the transformer 14 or electrical lines and is constructed of a nonconductive material. The end 60 of the extendable pole 62 is provided having a variety of configurations of connections 64, such as, but not limited to, a standard nut and bolt configuration as shown.

The connector portion 54 is shown in the present aspect as provided with a flange portion 66 defining an opening 68 for receiving the connections 64 on the extendable pole 62. The coupling of the connector portion 54 of the tool 40 to the extendable pole 62 will be discussed in greater detail hereinafter.

The tool 40 further includes a first tension member 70 defining a portion of the second end 46 of the body 42 adjacent the upper side 48 of the body 42. The first tension member 70 has an upper side 72 and a lower side 74. The tool is further provided with a second tension member 76 defining a portion of the second end 46 adjacent the lower side 50 of the body 42. The second tension member 76 has an upper side 78 and a lower side 80. A portion of the upper side 78 of the second tension member 76 and a portion of the lower side 74 of the first tension member 70 defining a slot 82 operable to receive a portion of the wildlife protection guard 10.

The tool 40 further includes a tensioning mechanism 90 which communicates with the first and second tension members 70 and 76, respectively. The tensioning mechanism 90 is operable to adjust a distance 92 between the lower side 74 of the first tension member 70 and the upper side 78 of the second tension member 76 to adjust the tension on the wildlife protection guard 10 receivable in the slot 82. It can be seen that the slot 82 is an opening between the first and second tension members 70 and 76 wherein a portion of the wildlife protection guard 10, such as the connecting wire 22, may be received into the slot 82 for tensioning engagement of the wildlife protection guard 10.

Based on the configuration of the wildlife protection guard 10, in that it clamps into position on the insulated bushing 12 in a resilient springing or clamping fashion, the tool 40, and more specifically, the first and second tension members 70 and 76, must be operable to provide sufficient tension to retain the wildlife protection guard 10 for placement on the insulated bushing 12 while being operable to release the wildlife protection guard 10 once it is clamped into position about the insulated bushing 12. Thus, it will be appreciated that the tensioning mechanism 90 provides the user with significant functional advantages, in that, the user may adjust the tension on the wildlife protection guard 10 disposed in the slot 82 by adjusting the tensioning mechanism 90.

In the present aspect, this may be accomplished where the tensioning mechanism 90 is a bolt 94 and wing-nut 96 configuration. In the present aspect, the first and second tension members 70 and 76, or the entire tool 40 for that matter, may be constructed of a substantially rigid polymeric material such as fiberglass or injection-molded plastic, so that the tool 40 is rugged and robust while, at the same time, providing the first and second tension members 70 and 76 with sufficient flexibility to move slightly when the wing-nut 96 is tightened in its engagement to the bolt 94.

So long as the tensioning mechanism 90 engages the first and second tension members 70 and 76 to adjust the opening in the slot 82, the physical placement on the tool 40 of the tensioning mechanism 90 is not a limiting factor.

Adjustment of the tensioning mechanism 90 results in the expansion or constriction of the slot 82 and the resulting distance 92 wherein a portion of the wildlife protection guard 10 is received. The user may, therefore, fine tune the tension to optimize the amount of tension necessary to retain the wildlife protection guard 10 for placement on the insulated bushing 12 while ensuring that the tool 40 will release the wildlife protection guard 10 once it is clamped into position about the insulated bushing 12. In other aspects (not shown), the tensioning mechanism 90 may be a spring connected to the first and second tension members 70 and 76 to produce substantially clothespin-like configuration. In this aspect, it may be useful for either the first or second tension members 70 and 76 to be free-floating to effect the resulting tension.

Figure 4:
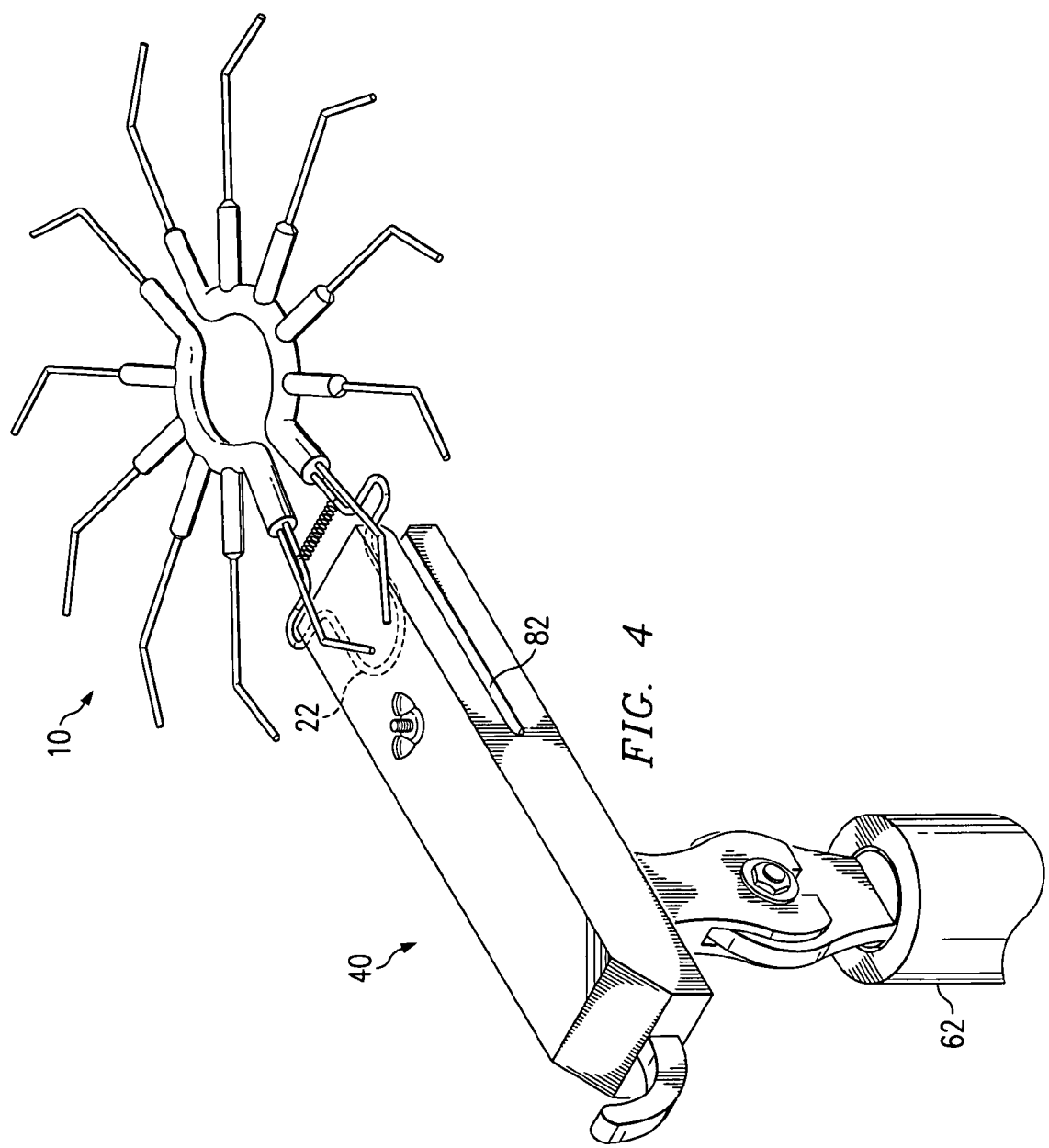
FIG. 4 is a perspective view of the tool retaining the wildlife protection guard according to one aspect of the present invention.

FIG. 4 is a perspective view of the tool 40 constructed in accordance with one aspect of the present invention shown retaining the wildlife protection guard 10, a portion of which is shown in phantom disposed in the slot 82. In this view, it is readily apparent that the tool 40 is well adapted to engage the wildlife protection guard 10 in a stable and controllable manner for placement on the insulated bushing 12.

It will be appreciated that when the tool 40 is connected to the extendable pole 62 and raised to a significant height, it is necessary that the tool 40 be capable of withstanding the shock of being knocked against portions of utility poles, as well as the transformer 14 and insulated bushing 12, without disengaging the wildlife protection guard 10. The engagement of the wildlife protection guard 10, as shown in the present view engaging a portion of the connecting wire 22, provides sufficient stability to ensure that the wildlife protection guard 10 does not easily become dislodged from the slot 82 of the tool 40 while the user attempts to install the wildlife protection guard 10 on the insulated bushing 12.

Frequently workers are required to navigate bushes, trees and other foliage and may have to reach over fences and other obstacles to reach the transformers 14 for placement of the wildlife protection guards 10. For this reason, it is necessary that the tool 40 be sufficiently robust for navigating these obstacles while securely retaining the wildlife protection guard 10.

Furthermore, it is problematic in these instances if the wildlife protection guard 10 becomes dislodged from the tool 40 since the wildlife protection guard 10 may become stuck in a tree or other foliage or on the other side of a fence or other barriers inaccessible to the worker. The tool 40 of the present invention is provided as a useful solution to overcome these challenges.

It will be appreciated that in other aspects (not shown), the opening of the slot 82 may be generally "V" shaped wherein the slot 82 is wider near the second end 46 of the tool 40. In this manner, as the connecting wire 22 of the wildlife protection guard 10 is inserted into the opening of the slot 82, the connecting wire 22 with become partially lodged and retained where the opening in slot 82 is constricted sufficient to contact and engage the connecting wire 22.

FIG. 5 illustrates another aspect of the present invention wherein the second end 46 of the tool 40 is shown as substantially cylindrically shaped and the first tensioning mechanism 90, according to anther aspect, is shown disposed about the first and second tension members 70 and 76. In this aspect, the tool 40 is constructed so as to be proportionately smaller as it extends toward the second end 46 of the tool 40. The tensioning mechanism 90 is shown (in this aspect) as a ring or band disposed about the second end 46 to engage the first and second tension members 70 and 76 to adjust the tension on the wildlife protection guard 10.

As the tension mechanism 90, according to the present aspect, is slid by the user from the second end 46 in a direction 91 toward the first end 44 of the tool 40, the tensioning mechanism 90 will engage the first and second tension members 70 and 76. Thus, the tensioning mechanism 90 will slidingly engage the first and second tension members 70 and 76 resulting in expansion and constriction of the opening of the slot 82 to adjust the tension on the wildlife protection guard 10.

Although the tensioning mechanism 90 is illustrated as band or ring extending substantially about the first and second tension members 70 and 76, in other aspects the tensioning mechanism 90 may be substantially "C" shaped such that the tensioning mechanism 90 does not extend completely around the first and second tension members 70 and 76.

FIG. 6 illustrates another aspect of the present invention wherein the first tension member 70 is provided with lateral flanges 100a and 100b corresponding to lateral flanges 102a and 102b of the second tension member 76. The tension mechanism 90, according to the present aspect, is shown as a plurality of couplings 104a and 104b, such as a standard nut and bolt coupling. In the present aspect, the coupling 104a engages the lateral flange 100a of the first tension member 70 and the lateral flange 102a of the second tension member 76 to adjust the slot 82 to obtain the desired tension on the wildlife protection guard 10. Thus, the present aspect illustrates another useful tensioning mechanism 90 operable for these purposes.

FIG. 7 is a front view of the tool 40 illustrating another aspect of the tensioning mechanism 90. In this aspect, the tensioning mechanism 90 includes a first bracket 110, such as a standard plate, positioned adjacent the upper side 72 of the first tension member 70 and a second bracket 112 positioned adjacent the lower side 80 of the second tension member 76. The tensioning mechanism 90 is further provided with the pair of couplings 114, such as a standard nut and bolt configuration, engaging the first and second brackets 110 and 112.

As the couplings 114 are tightened or loosened, the first and second brackets 110 and 112 cause the first and second tension members 70 and 76, respectively, to expand and compress. Thus, adjusting the tension on the wildlife protection guard 10 disposed in the slot 82 may be accomplished by adjusting the tensioning member, via the couplings 114.

FIG. 8 illustrates a cut-a-way partial side view according to another aspect of the present invention shown in FIG. 3 taken along 8—8. This view illustrates the tool 40 having another aspect of the tensioning mechanism 90 for adjusting the tension on the wildlife protection guard 10 receivable in the slot 82. In this aspect, the second tension member 76 is provided with a recess 120 wherein a tension plate 122 is disposed.

A plurality of springs 124 are positioned between the recess 120 in the second tension member 76 and the tension plate 122 forcing the tension plate 122 in a direction 123 toward the first tension member 70. The springs 124 may be standard coil springs or other devices well known and capable of providing such springing force. The second tension member 76 is provided with a first and second lip 126 and 128 defining the recess 120. The lips 126 and 128 define the upward boundary of the motion of the tension plate 122 toward the first member 70.

When a portion of the wildlife protection guard 10 is disposed in the slot 82 the wildlife protection guard 10 may engage the lower side 74 of the first tension member 70 and an upper side 130 of the tension plate 122. The tension plate 122 will cause the springs 124 to compress somewhat while the springs maintain pressure on the tension plate 122 and the portion of the wildlife protection guard 10 disposed therein the slot 82.

Thus, the tensioning mechanism 90 according to the present aspect, illustrates another means of adjusting the tension on the wildlife protection guard 10 receivable in the slot 82 to retain the wildlife protection guard 10 for these purposes. It should be appreciated, however, that the tensioning mechanism 90, in the presently illustrated aspect, may also be employed on the lower side 74 of the first tension member 70 as well, or utilized in conjunction on both the first and second tension members 70 and 76.

FIG. 9 is a side view illustrating another aspect of the tool 40 of the present invention. In this aspect the first tension member 70 is shown with a beveled side 140 near the second end 46 of the body 42 adjacent the slot 82. The second tension member 76 is also provided with a beveled side 142 adjacent the beveled side 140 of the first tension member 70. The beveled sides 140 and 142 of the first and second tension members 70 and 76, respectively, provide a widened opening of the slot 82 near the second end 46 of the body 42 for receiving a portion of the wildlife protection guard 10. The beveled sides 140 and 142 of the first and second tension members 70 and 76 are provided to allow for easy insertion of a portion of the wildlife protection guard 10 within the slot 82.

The first tension member 70 is further provided with a frictional surface 144 disposed on the lower side 74 of the first tension member 70. Similarly, the second tension member 76 is provided with a frictional surface 146 disposed on the upper side 78 of the second tension member 76. The frictional surfaces 144 and 146 may be a layer of rubber or other frictional material whether rigid or non-rigid suitable for frictionally engaging a portion of the wildlife protection guard 10 inserted in the slot 82.

The frictional material may be bondingly connected to the first and second tension members 70 and 76 or may be otherwise attached or formed with the first and second tension members 70 and 76. The frictional surfaces 144 and 146 are useful for frictionally engaging the wildlife protection guard 10 and may eliminate, according to some aspects, the necessity for the tensioning mechanism 90 or may be used in conjunction with the tensioning mechanism 90 to provide additional tensioning engagement and control of the wildlife protection guard 10 when disposed within the slot 82. Although according to the present aspect both frictional surfaces 144 and 146 are shown, in other aspects (not shown) only one of the frictional surfaces 144 or 146 may be utilized.

FIG. 10 illustrates a partial side view of another aspect of the present invention showing the hook portion 52 formed from a portion of the body 42 near the first end 44 of the body 42. It will be appreciated that the tool 40 of the present invention may be constructed of a variety of inexpensive materials, such as but not limited to, injection-molded plastic, and it may be beneficial for the tool 40 to be unitarily constructed or formed during such manufacture. In this manner, the hook portion 52 may be easily formed by providing a notched opening about the upper side 48 near the second end 46 of the body 42.

As will be discussed in greater detail hereinafter, the hook portion 52 is useful for removal of the wildlife protection guard 10 from a clamped position about the insulated bushing 12.

FIG. 11 illustrates another aspect of the tool 40 shown attached to a hammer head 160. The hammer head 160 is a tool commonly used by electric line workers for refusing blown fuses and is attachable to the extendable pole 62. The hammer head 160 is typically provided as a simple metallic implement having a generally T-shaped configuration. In this aspect, the tool 40 is shown having a substantially rectangular configuration wherein a portion of the lower side 50 is adapted to mate with the hammer head 160.

The tool 40 may be connected to the hammer head 160 utilizing a coupling 162 which may be a band or a strap engaging the tool 40 and the hammer head 160 to achieve a stable engagement of the tool 40 to the hammer head 160. Although the coupling 162 may be illustrated as a band or a strap, it will be appreciated that a number of couplings 162 may be utilized for these purposes such as, but not limited to, bolting, bonding or other couplings suitable for connecting the tool 40 to the hammer head 160 which will readily suggest themselves to one of ordinary skill in the art and are within the spirit and scope of the present invention.

FIG. 12 illustrates a rear view of another aspect of the first end 44 tool 40 of the present invention for connection to the hammer head 160. In this aspect, the tool 40 may be provided with an opening 164 near the first end 44 of the body 42. In this manner, a portion of the hammer head 160 may be inserted into the opening 164 in the body 42 of the tool 40 for connection of the tool 40 to the hammer head 160. Although the opening 164 may be illustrated as substantially circular, it will be appreciated that hammer heads 160 may be provided in a variety of configurations and the opening 164 may be of various shapes and sizes to accommodate the various configurations of the hammer head 160 to accomplish the mating connection of the tool 40 with the hammer head 160 for these purposes.

Figure 13:
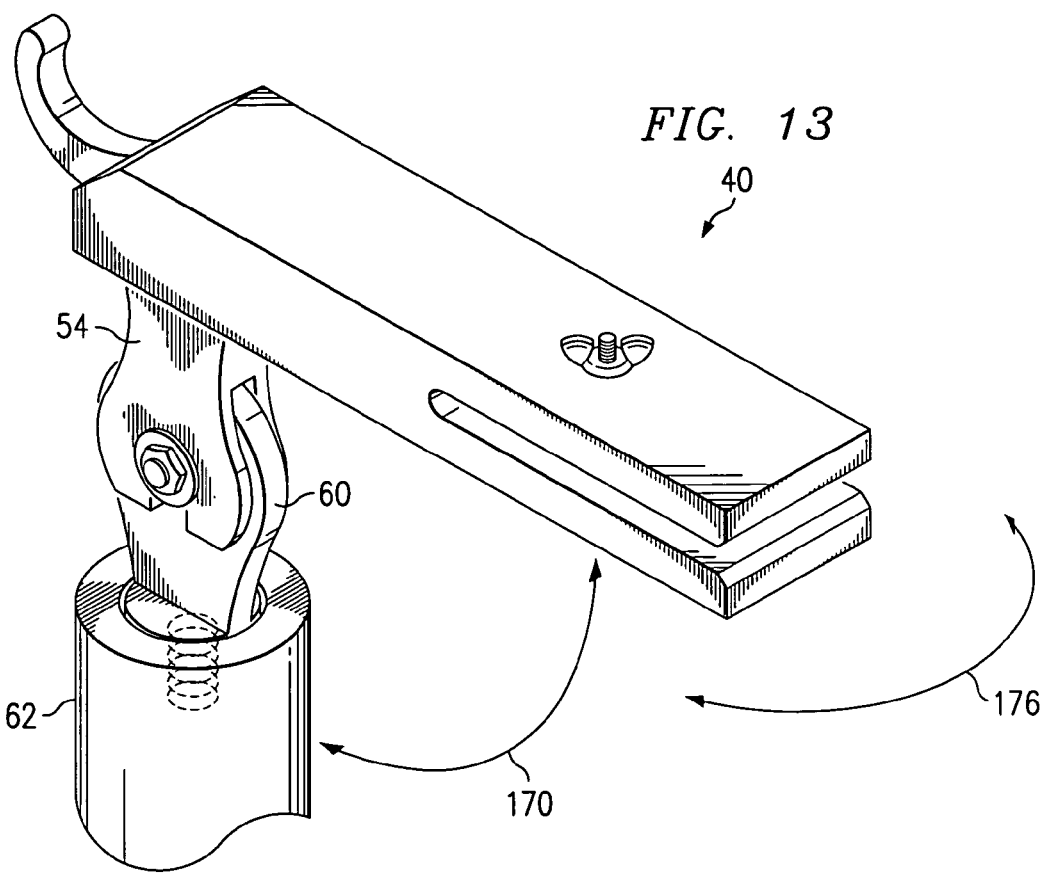
FIG. 13 is a perspective view of one aspect of the tool shown pivotably connected to an extendable pole.

FIG. 13 is a perspective view of the tool 40 of the present invention shown connected to the extendable pole 62 via the connector portion 54. As previously discussed, the connector portion 54 may be connected to an end 60 of the extendable pole 62 adapted to receive the connector portion 54. This connection may be accomplished in a variety of manners including a standard nut and bolt coupling wherein the connector portion 54 and the end 60 of the extendable pole 62 may have a geared configuration for a ratcheting coupling to allow the tool 40 to be pivotably attachable to the end 60 of the extendable pole 62.

The pivoting attachment of the tool 40 to the extendable pole 62 in this manner allows the tool to pivot along an angle of motion 170 from a first position (illustrated in the present view) wherein the tool 40 is substantially perpendicularly disposed relative to the extendable pole 62 to a second position (not shown) wherein the tool is positioned in a substantially non-perpendicular relationship relative to the extendable pole 62. It is readily apparent that as the user rotates the extendable pole 62, the tool 40 will correspondingly rotate along an arc 176. Manipulation of the tool 40 along arc 176 and the angle of motion 170 is useful for proper positioning of the tool 40.

Figure 14:
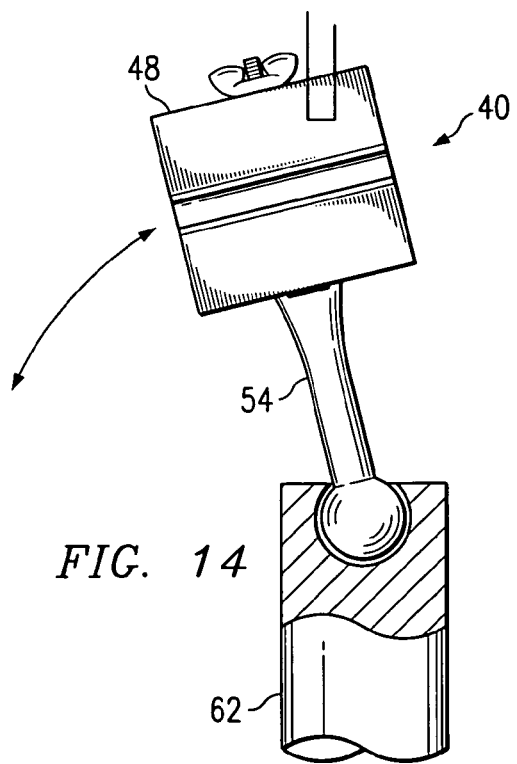
FIG. 14 is a side perspective view of another aspect of the tool shown pivotably connected to the elongated pole for side-to-side angulation of the tool relative to the elongated pole.

FIG. 14 illustrates another aspect of the tool 40 of the present invention shown pivotably coupled to the extendable pole 62. In this aspect, the connector portion 54 is shown connected to the extendable pole 62 in a ball and socket fashion wherein the connector portion 54 is operable to position the tool 40 in a third position (shown in the present view) wherein the tool 40 is substantially angularly offset the extendable pole 62. The third position allows the tool 40 to be slanted relative to the extendable pole 62 in a side-to-side manner such that the upper side 48 of the body is angled in a direction away from the extendable pole 62.

The ball and socket configuration of the connector portion 54 of the tool is illustrated according to one aspect, however, it will be appreciated that any number of configurations of the connector portion 54 to the extendable pole 62 may be utilized to accomplish the angular disposition of the tool 40 relative to the extendable pole in a side-to-side manner for these purposes. Such as, but not limited to, hinging or bearing configurations. Furthermore, the tool 40 may have such side-to-side angular disposition capabilities when the tool 40 is connected to the hammer head 160 utilizing various configurations which will readily suggest themselves to one of ordinary skill in the art and are within the spirit and scope of the present invention as disclosed and claimed herein.

Figure 15:
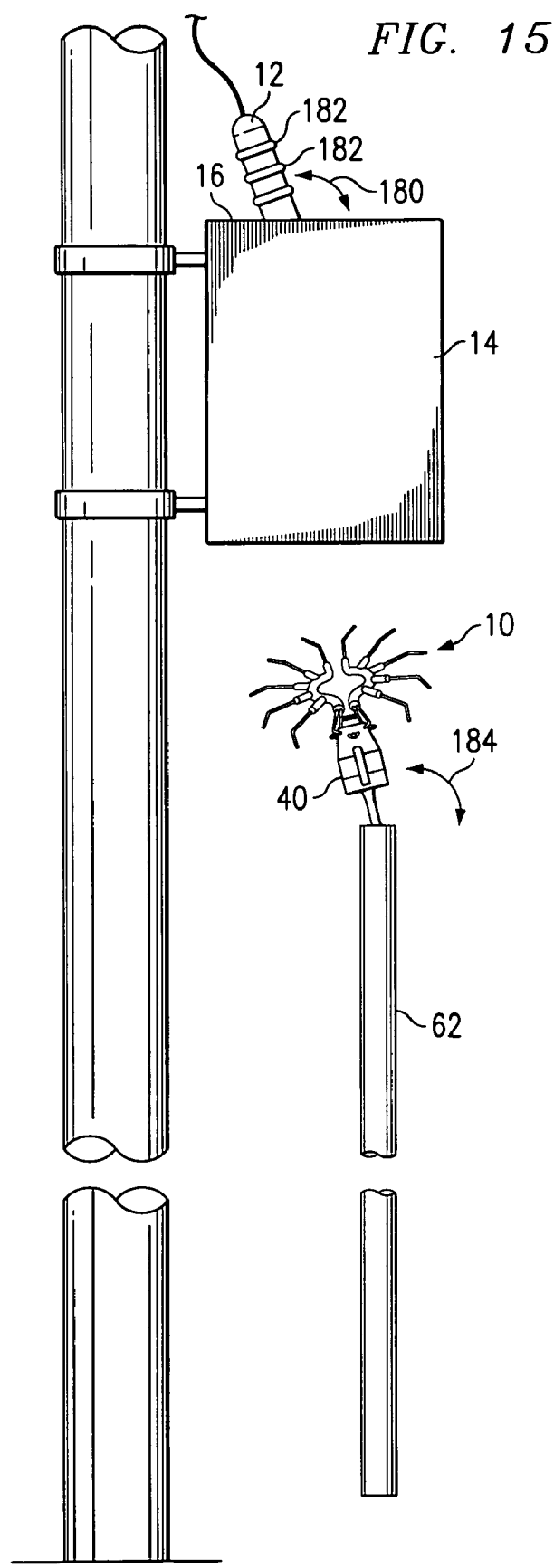
FIG. 15 is a partial elevation view of one aspect of the tool shown angularly positioned relative to the elongated pole for positioning the wildlife guard on the insulated bushing angularly disposed on the transformer.

FIG. 15 is a perspective view of the tool 40 according to one aspect of the present invention shown retaining the wildlife protection guard 10 for placement on the insulated bushing 12 on the transformer 14. In the present view, the insulated bushing 12 is angularly disposed relative to the top 16 of the transformer 14 at an angle 180. The insulated bushing 12 is provided with multiple skirts 182 circumferentially disposed about the insulated bushing 12 between which the wildlife protection guard 10 is attached. When the insulated bushing 12 is angled relative to the transformer 14, placement of the wildlife protection guard 10 becomes difficult unless the wildlife protection guard 10 can be similarly angularly positioned prior to placement. Otherwise, the insulated members 20a and 20b of the wildlife protection guard 10 are unable to clamp about the insulated bushing 12 because they are impeded by the skirts 182 extending from the insulated bushing 12.

By providing the tool in the third position (shown in FIG. 14 and illustrated in the current view) wherein the tool 40 is substantially angularly offset the end of the extendable pole 62, the wildlife protection guard 10 retained within the slot 82 of the tool 40 may be positioned at an angle 184 similar to the angle 180 of disposition of the insulated bushing 12 relative to the transformer 14. In this manner, the wildlife protection guard 10 may be placed on the insulated bushing 12 in a manner that will not be impeded by the skirts 182 on the insulated bushing 12. The functionality provided by the connector portion 54 which enables the tool 40 to be angled relative to the extendable pole 62 provides considerable advantage to ensure successful and accurate placement. Since transformers 14 are frequently provided with insulated bushings 12 that are angularly disposed relative to the tops 16 of the transformer 14.

Figure 16:
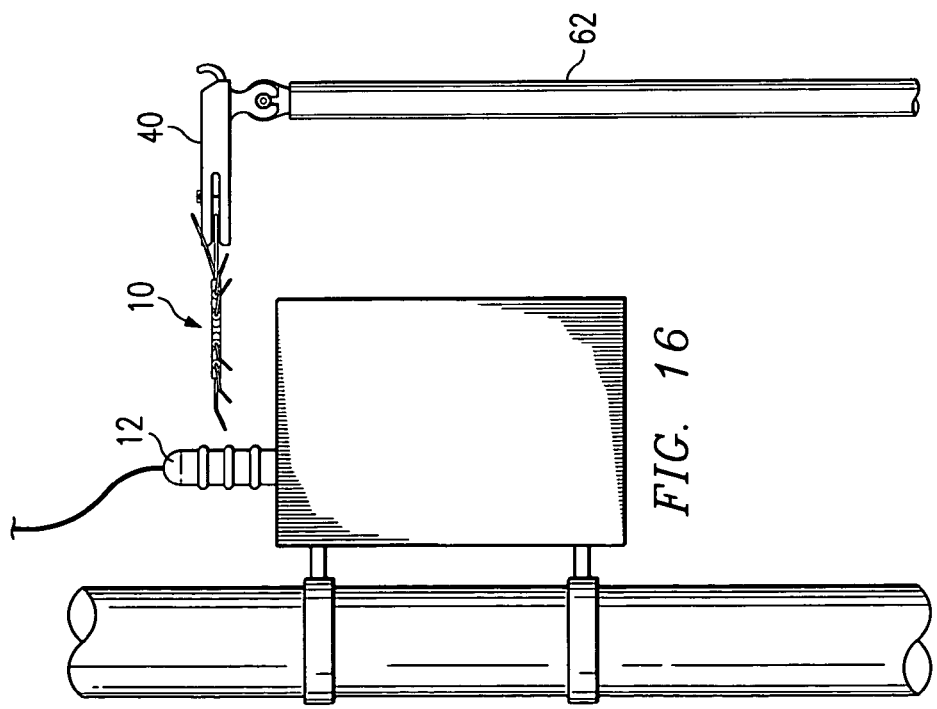
FIG. 16 is a partial elevational view of one aspect of the tool of the present invention illustrating placement of the wildlife protection guard on the insulated bushing on the transformer.

FIG. 16 is a perspective view illustrating the wildlife protection guard 10 retained in the slot 82 of the tool 40 for placement on the insulated bushing 12 on the transformer 14. The method of utilizing the tool includes inserting a portion of the wildlife protection guard 10 into the slot 82 of the tool 40. Thereafter, the tool which may be connected to the extendable pole 62 or may be attachable to an end 60 of the extendable pole 62 or in other aspects may be attachable to the hammer head 160 is then raised by the worker on the ground to a height substantially equivalent to the height of the insulated bushing 12 on the transformer 14.

The extendable pole 62 is manipulated to bring the wildlife protection guard 10 into contact with the insulated bushing 12 such that the wildlife protection guard 10 is clamped into position about the insulated bushing 12. The worker may then manipulate the extendable pole to withdraw the tool 40 from about the insulated bushing 12 whereby the portion of the wildlife protection guard 10 disposed within the slot 82 of the tool 40 is withdrawn and removed from the slot 82 so that the wildlife protection guard 10 remains clamped about the insulated bushing 12.

Figure 17:
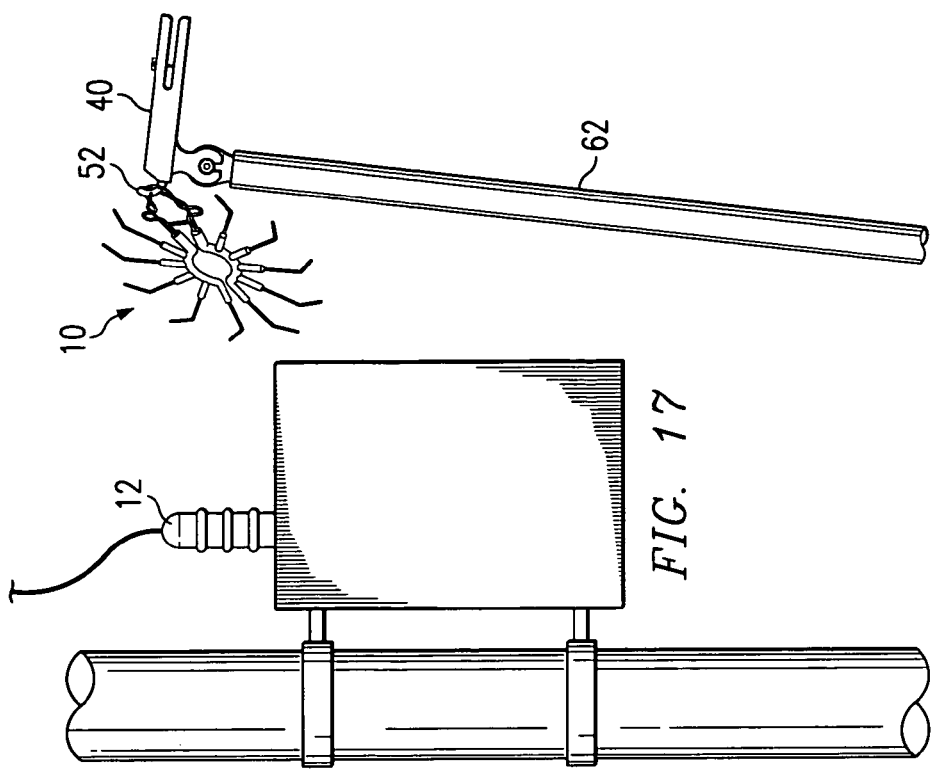
FIG. 17 is a partial elevational view of one aspect of the tool of the present invention illustrating use of the hook portion for removal of the wildlife protection guard from the insulated bushing.

FIG. 17 is a perspective view illustrating use of the tool according to one aspect of the present invention for removal of the wildlife protection guard 10. From time-to-time it may become necessary to remove the wildlife protection guards 10, such as when the wildlife protection guards 10 are incorrectly placed about the insulated bushing 12 particularly when the insulated bushing 12 is angularly disposed on the transformer 14. The hook portion 52 of the tool 40 is useful for dislodging and removing the wildlife protection guard 10 from the insulated bushing 12 for these purposes, as well as when the wildlife protection guard 10 becomes damaged or ineffective.

It will be appreciated, as previously mentioned, that frequently foliage and barriers interfere with the placement and removal of the wildlife protection guard 10. Thus, it is necessary to be able to remove the wildlife protection guard 10 in a manner that allows the worker to maintain control of the wildlife protection guard 10 until it reaches the ground. Otherwise, the wildlife protection guard 10 may become dislodged and become stuck in a tree or other foliage or may land on the other side of a barrier, such as a fence, where it may not be retrievable by the worker.

The hook portion 52 is useful in that the upwardly angular disposition, according to one aspect of the hook portion 52, allows the hook portion 52 to be utilized by the worker to hook a portion of the wildlife protection guard 10, such as the connecting wire 22 which has a loop-like configuration. Thus, the worker is able to manipulate the extendable pole 62 to bring the hook portion 52 into hooking engagement with, for example, the looping portion of the connecting wire 22 and disengage the wildlife protection guard 10 from the insulated bushing 12 while maintaining control of the wildlife protection guard 10 about the hook portion 52 of the tool 40. The worker may then retrieve the wildlife protection guard 10 from the hook portion 52, such as by lowering the extendable pole 62 in a telescoping manner, or otherwise, depending on the configuration of the extendable pole 62.

The present invention provides additional advantages as well. The telescoping nature of the extendable pole 62 causes the extendable pole 62 to bow or curve somewhat when extended to significant heights. Accurately manipulating the tool 40 is difficult when the extendable pole 62 is so curved. Also, this curvature of the extendable pole 62 may cause the tool 40 to be at an undesired attitude relative to the insulated bushing 12. The combination of difficulty manipulating the extendable pole 62 and the improper angle of the tool 40 makes it problematic for the user to accurately move the tool 40 directly into and then away from the insulated bushing 12.

The present invention overcomes this difficulty by providing the slot 82 extending a distance from the second end 46 of the tool 40. Once the wildlife protection guard 10 is installed about the insulated busing 12, the user merely rotates the extendable pole 62. As the tool 40 rotates, a portion of the connecting wire 22 of the wildlife protection guard 10 is allowed to extend through the slot 82 along the side of the tool 40 for easy disengagement of the wildlife protection guard 10.

FIG. 18 illustrates another aspect of the tool 40 shown as a generally rectangular member. In this illustration, the connector portion 54 is shown adjacent the first end 44 of the body 42. As previously discussed, the connector portion 54 may be provided with a plurality of gears 200 and be configured for connection to a universal head or universal attachment typically provided adjacent the end 60 of the extendable pole 62 (see FIG. 13). It will be appreciated that any number of connections for coupling to a variety of different extendable poles 62 is within the spirit and scope of the present invention. In this aspect, the hook portion 52 is shown extending adjacent the upper side 48 of the body 42. The present embodiment illustrates a configuration which may lend itself toward inexpensive construction, such as by injection molding or otherwise.

FIG. 19 illustrates another aspect of the present invention wherein the connector portion 54 is shown connected adjacent the lower side 50 of the body 42. In this aspect, the tool 40 is provided with the body 42 having a first body portion 210 and a second body portion 212. The first body portion 210 is provided with a threaded member 214 adapted to be received by a first end 216 of the second body portion 212. The tool 40 of the present invention further includes a tightening member 218 which may be a nut operative to be threaded on the threaded member 214 to engage the first end 216 of the second body portion 212.

It is apparent that this configuration provides a simple design useful for angularly positioning the second body portion 212 relative to the first body portion 210 when it is necessary to achieve an angle 184 (see FIG. 15) of the second body portion 212 relative to the extendable pole 62. A variety of additional configurations may be employed to provide the advantages of the tool 40 illustrated in FIG. 19 and are within the spirit and scope of the present invention as disclosed and claimed herein.

Figure 20:
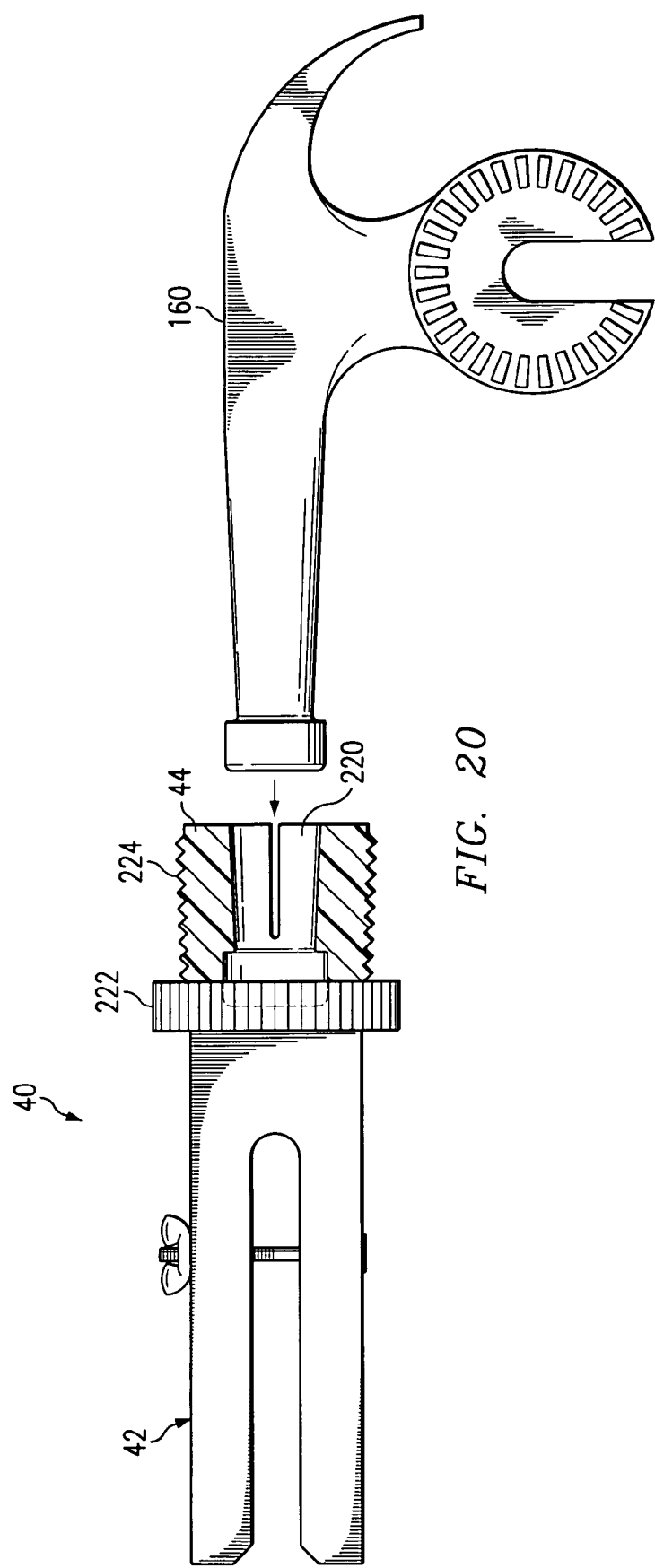
FIG. 20 is a side view of the tool constructed in accordance with one aspect for coupling to a hammer head.

FIG. 20 illustrates another aspect of the tool 40 for connection to the hammer head 160 which is frequently employed as previously discussed. Although the present embodiment illustrates connection of the tool 40 to the hammer head 160, it should be appreciated that a number of tools are utilized by line workers that are connectable to the extendable pole 62 and, although only coupling the tool to the hammer head 160 is shown, it is within the scope of the present invention that the tool 40 may be adapted with only minor modification to couple to a variety of tools utilized by line workers and connectable to the extendable pole 62.

In this illustration, the first end 44 of the body 42 is provided with a cavity 220 within the body 42 sufficient to receive a portion of the universal head 160. The present aspect further includes a coupling 222 which may be a standard nut, or split-ring type adapter or other configuration well known for engaging a threaded portion 224 near the first end 44 of the tool 40. It can be seen that the body 42 is slightly wider or greater in circumference near the first end 44 of the tool 40.

Once the portion of the hammer head 160 has been inserted within the cavity 220, the coupling 222 may then threadingly engage the threaded portion 224 causing the tool 40 to be sufficiently coupled to the hammer head 160. It will be appreciated that another advantage of the present embodiment is that it allows for easy rotation of the tool 40 relative to the hammer head 160 to achieve the angled disposition of the tool 40 relative to the extendable pole 62 for the purposes previously discussed above.

Thus, it is apparent that there has been provided, in accordance with the present invention, a wildlife guard placement tool that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the various elements or components may be combined or integrated in another system or certain features may not be implemented.

Also, the techniques, systems, sub-systems, and methods described and illustrated in the preferred embodiment as discrete or separate may be combined or integrated with other systems, modules, techniques, or methods without departing from the scope of the present invention. Other items shown as directly coupled to each other may be coupled through some other interface or device, such that the items may no longer be considered directly coupled to each other but may still be in communication with one another. Other examples of changes, substitutions, and alterations are readily ascertainable by one skilled in the art and could be made without departing from the spirit and scope of the present invention.

What is claimed is:

1. A tool for placement of a wildlife protection guard on an insulated bushing portion of a transformer, the tool comprising:
   a body having a first end, a second end, an upper side and lower side, a portion of the body adjacent the second end defining an opening extending a distance from the second end of the body toward the first end of the body, the opening operable to receive a portion of the wildlife protection guard; and
   a tensioning mechanism disposed within the opening to facilitate tensioning the portion of the wildlife protection guard disposable in the opening of the body, wherein the tensioning mechanism comprises at least one tension plate disposed in a recess within the opening.

2. The tool of claim 1 further comprising a hook portion adjacent the first end of the body, the hook portion extending generally upwardly and operable for engaging the portion of the wildlife protection guard for disengaging the wildlife protection guard from the insulated bushing portion of the transformer.

3. The tool of claim 1 wherein the tensioning mechanism comprises at least one frictional surface disposed within the opening.

4. An tool for placement of a wildlife protection guard on an insulated bushing portion of a transformer, the tool comprising:
   a body having a first end, a second end, an upper side and lower side, a portion of the body adjacent the second end defining an opening extending a distance from the second end of the body toward the first end of the body, the opening operable to receive a portion of the wildlife protection guard; and
   a hook portion adjacent the first end of the body, the hook extending generally upwardly and operable for engaging the portion of the wildlife protection guard for disengaging the wildlife protection guard from the insulated bushing portion of the transformer; and
   a tensioning mechanism disposed within the opening to facilitate tensioning the portion of the wildlife protection guard disposable in the opening of the body, wherein the tensioning mechanism comprises at least one tension plate disposed in a recess within the opening.

5. The tool of claim 4 wherein the tensioning mechanism further comprises at least one frictional surface disposed within the opening.

6. The tool of claim 1 wherein the at least one tension plate is spring loaded in the recess within the opening.

7. The tool of claim 4 wherein the at least one tension plate is spring loaded in the recess within the opening.

8. A method for placement of a wildlife protection guard on an insulated bushing portion of a trandformer, the method comprising:
   providing a tool for placement of a wildlife protection guard on the insulated bushing portion of the transformer, the tool comprising:
   a body having a first end, a second end, an upper side and lower side, a portion of the body adjacent the second end defining an opening extending from the second end of the body toward the first end of the body, the opening operable to receive a portion of the wildlife protection guard,
   a hook portion adajacent the first end of the body, the hook extending generally upwardly and operable for engaging the portion of the wildlife protection guard for disengaging the wildlife protection guard from the insulated bushing portion of the transformer, and
   a tensioning mechanism disposed within the opening to facilitate tensioning the portion of the wildlife protection guard disposable in the opening of the body, wherein the tensioning mechansim comprises at least one tension plate disposed in a recess within the opening;
   providing an elongated pole connected to the tool, the tool connected to the elongated pole at one end of the elongated pole;
   inserting a portion of the wildlife protection guard in the opening in the body of the tool such that the wildlife protection guard is retained by the tool;
   manipulating the elongated pole such that the wildlife protection guard is substantially adajacent the insulated bushing on the transformer;
   manipulating the elongated pole to clamp the wildlife protection guard on the insulated bushing on the transformer; and
   manipulating the elongated pole to withdraw the wildlife protection guard from the opening in the body of the tool.

9. The method of claim 8 wherein the method further comprises pivoting the tool relative to the elongated pole based upon an angular disposition of the insulated bushing on the transformer.

10. The method of claim 8 wherein manipulating the elongated pole to withdraw the wildlife protection guard from the opening in the body of the tool further includes rotating the extendable pole.

11. The method of claim 8 wherein the method further comprises:
    manipulating the elongated pole by bringing the hook portion of the tool adjacent to the wildlife protection guard installed on the insulated bushing of the transformer;
    manipulating the elongated pole such that the hook portion of the tool hooks the portion of the wildlife protection guard;
    manipulating the elongated pole such that the tool is extended away from the insulated bushing on the transformer to withdraw the wildlife protection guard from engagement with the insulated bushing on the transformer; and
    retaining the wildlife protection guard suspended on the hook portion of the tool.

12. The method of claim 8 wherein the tensioning mechanism further comprises at least one frictional surface disposed within the opening.

13. The method of claim 8 wherein the at least one tension plate is spring loaded in the recess within the opening.

* * * * *